(12) United States Patent
Tajima et al.

(10) Patent No.: US 8,724,589 B2
(45) Date of Patent: May 13, 2014

(54) WIRELESS COMMUNICATION SYSTEM

(75) Inventors: Yoshiharu Tajima, Kawasaki (JP);
Yoshinori Tanaka, Kawasaki (JP);
Yoshihiro Kawasaki, Kawasaki (JP);
Yoshiaki Ohta, Kawasaki (JP);
Masatsugu Shimizu, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 13/305,273

(22) Filed: Nov. 28, 2011

(65) Prior Publication Data

US 2012/0069735 A1   Mar. 22, 2012

Related U.S. Application Data

(63) Continuation of application No. PCT/JP2009/060942, filed on Jun. 16, 2009.

(51) Int. Cl.
*H04W 4/00* (2009.01)
*H04W 36/02* (2009.01)

(52) U.S. Cl.
CPC .................................... *H04W 36/02* (2013.01)
USPC ......................................... 370/331; 455/436

(58) Field of Classification Search
CPC .... H04W 36/02; H04W 36/023; H04W 36/04
USPC ......... 370/225, 274, 315, 328, 331, 332, 333,
370/338, 480, 492, 496; 455/436, 437, 438,
455/439, 440, 441, 442, 443, 444
See application file for complete search history.

(56) References Cited

U.S. PATENT DOCUMENTS

| 8,300,570 | B2 * | 10/2012 | Zhang et al. | 370/315 |
| 2003/0008632 | A1 * | 1/2003 | Menon et al. | 455/403 |
| 2005/0288023 | A1 | 12/2005 | Kim et al. | |
| 2006/0056448 | A1 * | 3/2006 | Zaki et al. | 370/466 |

(Continued)

FOREIGN PATENT DOCUMENTS

| CN | WO/2008/124984 | * 10/2008 |
| EP | 2 031 924 | 3/2009 |

(Continued)

OTHER PUBLICATIONS

Cai et al., Machine translation of WO/2008/124984, Oct. 2008, WIPO.*

(Continued)

*Primary Examiner* — Paul H Masur
*Assistant Examiner* — Michael Phillips
(74) *Attorney, Agent, or Firm* — Myers Wolin, LLC

(57) ABSTRACT

A wireless communication system includes a relay station, first and second wireless base stations, a gateway device, and a mobile station. The gateway device is connected to the first and second wireless base stations by a cable. The first and second wireless base stations are interconnected by a cable. The relay station is connected wirelessly to the first wireless base station to perform relayed communication via the first wireless base station. When the mobile station at a lower level than the relay station executes handover to the second wireless base station, the first wireless base station switches a data transfer route by redirecting data which is not yet completely transmitted to the mobile station, to be forwarded to the second wireless base station.

7 Claims, 12 Drawing Sheets

(56) References Cited

U.S. PATENT DOCUMENTS

| | | | | |
|---|---|---|---|---|
| 2007/0091848 | A1* | 4/2007 | Karia et al. | 370/331 |
| 2007/0133500 | A1* | 6/2007 | Rajkotia et al. | 370/348 |
| 2007/0153740 | A1* | 7/2007 | Chang et al. | 370/331 |
| 2007/0249347 | A1* | 10/2007 | Saifullah et al. | 455/436 |
| 2008/0064403 | A1* | 3/2008 | Take | 455/436 |
| 2008/0123673 | A1* | 5/2008 | Lee | 370/412 |
| 2008/0130577 | A1* | 6/2008 | Park et al. | 370/331 |
| 2008/0279134 | A1* | 11/2008 | Lee | 370/315 |
| 2008/0316968 | A1* | 12/2008 | Sun et al. | 370/331 |
| 2009/0088164 | A1* | 4/2009 | Shen et al. | 455/436 |
| 2009/0117901 | A1* | 5/2009 | Zhao et al. | 455/436 |
| 2009/0262701 | A1* | 10/2009 | Motegi et al. | 370/331 |
| 2010/0008327 | A1* | 1/2010 | Son et al. | 370/331 |
| 2010/0046396 | A1* | 2/2010 | Cai et al. | 370/254 |
| 2010/0067484 | A1* | 3/2010 | Kagimoto et al. | 370/331 |
| 2010/0099415 | A1* | 4/2010 | Li et al. | 455/436 |
| 2010/0202322 | A1* | 8/2010 | Cai et al. | 370/254 |
| 2010/0297998 | A1 | 11/2010 | Hapsari et al. | |
| 2011/0038284 | A1* | 2/2011 | Senarath et al. | 370/279 |
| 2012/0002589 | A1* | 1/2012 | Saifullah et al. | 370/315 |
| 2012/0008561 | A1* | 1/2012 | Wang et al. | 370/328 |
| 2012/0177007 | A1* | 7/2012 | Kagimoto et al. | 370/331 |

FOREIGN PATENT DOCUMENTS

| | | | |
|---|---|---|---|
| EP | 2 051 454 | | 4/2009 |
| EP | 2051454 | * | 4/2009 |
| EP | 2 214 360 | | 8/2010 |
| JP | 2008-503172 | | 1/2008 |
| JP | 2009-081513 | | 4/2009 |
| WO | 2005/120183 | | 12/2005 |
| WO | 2009/050205 | | 4/2009 |
| WO | 2009/057684 | | 5/2009 |

OTHER PUBLICATIONS

Office Action issued for corresponding Japanese Patent Application No. 2011-519340 dated Jul. 10, 2012 with partial English translation.
International Search Report issued for corresponding International Patent Application No. PCT/JP2009/060942, mailed Sep. 8, 2009.
3GPP TR 25.913 V7.3.0 (Mar. 2006); 3rd Generation Partnership Project; Technical Specification Group Radio Access Network; "Requirements for Evolved UTRA (E-UTRA) and Evolved UTRAN (E-UTRAN)"; (Release 7); Dated Mar. 2006.
3GPP TS 36.423 V8.5.0 (Mar. 2009); 3rd Generation Partnership Project; Technical Specification Group Radio Access Network; "Evolved Universal Terrestrial Radio Access Network (E-UTRAN); X2 application protocol (X2AP)"; (Release 8); Dated Mar. 2009.
3GPP TR 36.913 V8.0.1 (Mar. 2009); 3rd Generation Partnership Project; Technical Specification Group Radio Access Network; "Requirements for further advancements for Evolved Universal Terrestrial Radio Access (E-UTRA) (LTE-Advanced)"; (Release 8); Dated Mar. 2009.
Ki-Dong Lee et al.; "BS Coordinated Mesh Networking" IEEE 802.16 Presentation Submission Template (Rev. 9); Submitted Oct. 31, 2008; Document No. [IEEE S802.16m-08/1355]; LG Electronics; Oct. 2008 page of "Procedure of BSCMN (3/3)" [Ref.: ISR mailed Sep. 8, 2009].

* cited by examiner

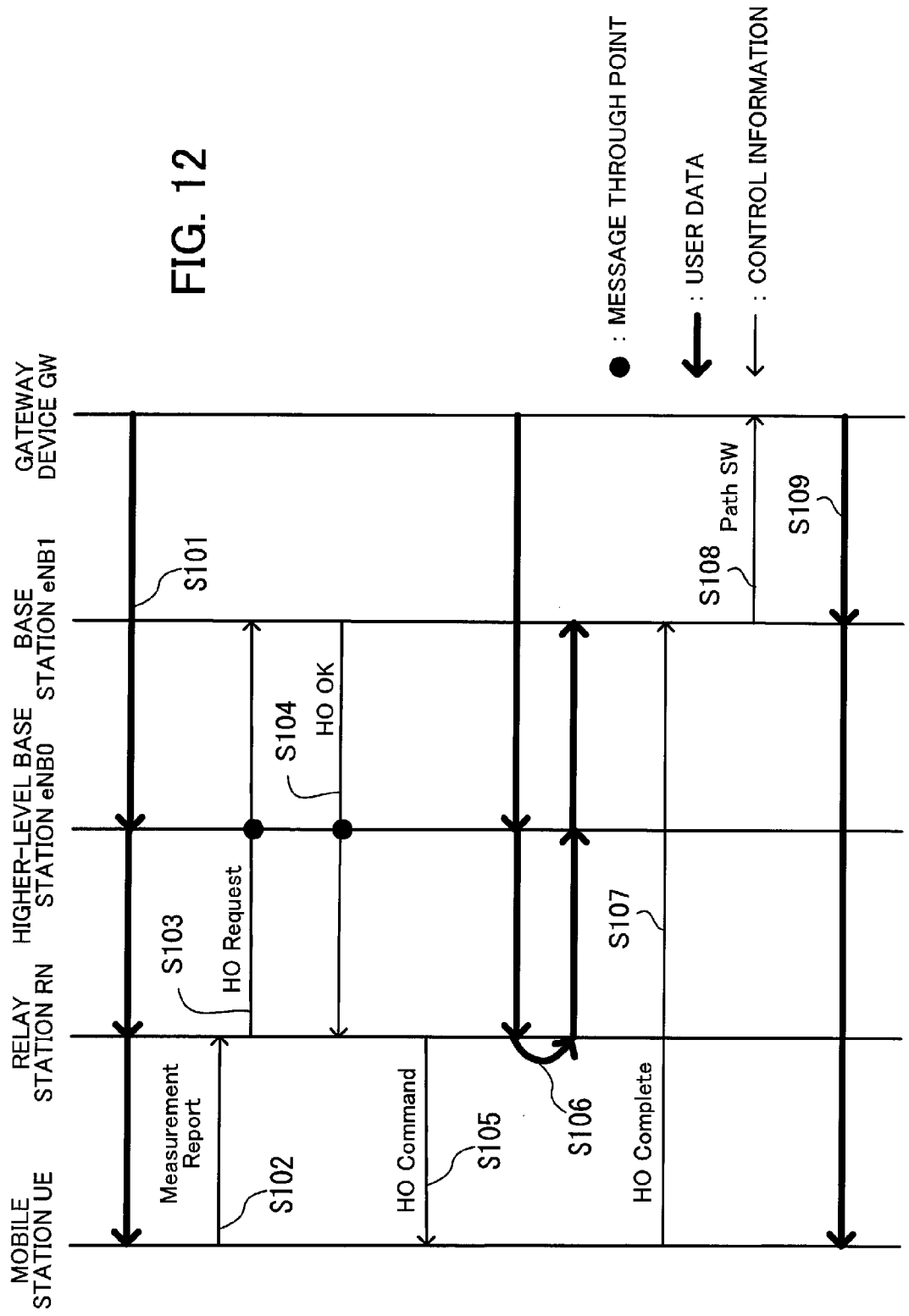

WIRELESS COMMUNICATION SYSTEM

This application is a continuing application, filed under 35 U.S.C. §111(a), of International Application PCT/JP2009/060942, filed on Jun. 16, 2009, the contents of which are herein wholly incorporated by reference.

FIELD

The present invention relates to wireless communication systems which include, for example, a mobile communication system.

BACKGROUND

Cellular system has become the mainstream of mobile communication systems such as mobile phone systems, in which a plurality of areas (cells), which are ranges within which respective base stations can communicate with mobile stations, are combined together to cover a wider area, and as a mobile station moves, the base station communicating therewith is switched from one to another to enable continued communication.

Currently, third-generation mobile communication services based on the CDMA (Code Division Multiple Access) technology have been launched, and also studies have been actively made on next-generation mobile communication methodology enabling faster communications.

In the 3GPP (3rd Generation Partnership Project), on the other hand, LTE (Long Term Evolution) as well as high-speed wireless service called LTE-advanced, which is an advanced version of LTE, are under review. LTE-advanced plans to introduce relay stations (relays) as a means of achieving high throughput and improving the characteristics in dead areas.

Relay station may be configured in such a manner that mobile stations are unable to recognize the presence of the relay station. In the 3GPP, however, relay stations configured to operate equivalently to ordinary wireless base stations are chiefly under consideration. In this case, for the relay station, a base station at a higher level than the relay station looks as if it were behaving like a mere node such as a router.

As conventional techniques for wireless communication systems including relay stations, a technique has been proposed whereby the amount of signaling is reduced to lessen the frequency of transmissions of a mobile station (Japanese Laid-open Patent Publication No. 2009-81513 (paragraph nos. [0035] to [0047], FIGS. 1 and 2)).

In both LTE and LTE-advanced, base stations often communicate with each other for purposes of handover or interference control. Inter-base station communication interface is defined as X2 interface.

FIG. 9 illustrates such an inter-base station interface. A wireless network 5a includes base stations eNB0 to eNB4. In accordance with the X2 interface of LTE, base stations are connected to each other by a cable. In the illustrated case, the base station eNB0 is connected with the base stations eNB1 to eNB4 through wired transmission paths X2-1 to X2-4, respectively.

For simplicity's sake, only the interface between the base station eNB0 and each of the base stations eNB1 to eNB4 is illustrated. In practice, each base station is connected to every other base station, thus providing a mesh connection.

When communicating with other base stations, the base station eNB0 uses the X2 interface for cable communication. For example, the base station eNB0 uses the wired transmission path X2-1 when communicating with the base station eNB1, and uses the wired transmission path X2-2 when communicating with the base station eNB2.

In this manner, inter-base station communication via the X2 interface is normally effected through a cable. However, where a relay station configured to operate equivalently to a base station exists as stated above, the relay station and a higher-level base station are interconnected wirelessly, and therefore, a wireless interval is included as part of the X2 interface.

FIG. 10 illustrates an inter-base station interface involving a relay station. A wireless network 5b includes base stations eNB0 to eNB4, a relay station RN, and a mobile station UE.

The relay station RN operates in a manner equivalent to ordinary base stations. At a level higher than the relay station RN, a higher-level base station exists (in the illustrated example, the base station eNB0; the higher-level base station is also called Donor), and the relay station RN and the higher-level base station eNB0 are interconnected by a radio propagation path X2-5. The mobile station UE is at a level lower than the relay station RN.

When the relay station RN communicates with any of the base stations eNB1 to eNB4, the communication is performed via the higher-level base station eNB0 and thus involves not only wired communication but wireless communication. For example, when the relay station RN communicates with the base station eNB1, the radio propagation path X2-5 and the wired transmission path X2-1 are used.

Meanwhile, the X2 interface is used also for the transfer (Forwarding) of user data at the time of handover, in addition to the transmission of control information. Forwarding of the user data (hereinafter referred to merely as data) means that a base station as the source of handover transfers, to a base station as the target of handover, data which is not yet completely transmitted to the mobile station.

Such transfer control permits the forwarded data to be transmitted from the target base station to the mobile station when the handover is completed, whereby loss of data due to the handover is prevented.

Where the source base station is a relay station, data is transmitted to the relay station via the higher-level base station. When the data is to be forwarded because of handover, however, the data is again sent back to the higher-level base station and then is forwarded to the handover target base station.

Thus, in the case of a handover involving a relay station as stated above, the data is forwarded by carrying out wireless communication from the higher-level base station to the relay station and wireless communication from the relay station to the higher-level base station. This is, however, undesirable in the light of efficient use of the radio propagation path.

FIG. 11 illustrates the manner of how a handover is executed on a wireless network. The wireless network 5c includes a higher-level base station eNB0, a base station eNB1, a gateway device GW, a relay station RN, and a mobile station UE. The higher-level base station eNB0, the base station eNB1 and the gateway device GW are connected to each other by a wired transmission path. The higher-level base station eNB0 and the relay station RN are connected to each other by a radio propagation path, and the mobile station UE exists at a level lower than the relay station RN.

The thick arrow in FIG. 11 indicates a route along which the data output from the gateway device GW is forwarded when the mobile station UE is handed over from the relay station RN to the base station eNB1.

FIG. 12 illustrates a handover sequence, wherein a handover of the mobile station UE from the relay station RN to the base station eNB1 is executed on the wireless network 5c. Thick arrows indicate flows of data, and thin arrows indicate flows of control information.

S101: The gateway device GW transmits data to the mobile station UE. Specifically, the data is transmitted first to the higher-level base station eNB0, where receiving and transmitting processes are executed and the data is transmitted to the relay station RN. Subsequently, the relay station RN performs receiving and transmitting processes and transmits the data to the mobile station UE.

S102: When executing a handover, the mobile station UE measures the reception levels of radio waves received from nearby base stations and transmits information about the measured reception levels to the relay station RN by including the measurement information in a Measurement Report.

S103: On receiving the Measurement Report, the relay station RN recognizes that the mobile station UE is going to execute a handover, and identifies, based on the reception level measurement information, the base station eNB1 with respect to which a satisfactorily high reception level has been measured, as a candidate for the target of handover.

The relay station RN transmits an HO Request (handover request signaling) to the base station eNB1. The HO Request is transmitted via the higher-level base station eNB0 to the base station eNB1.

S104: On receiving the HO Request, the base station eNB1 determines whether or not the handover is possible. If the handover is possible, the base station eNB1 sends an HO OK (handover permission signaling) as a response. The HO OK is transmitted via the higher-level base station eNB0 to the relay station RN.

S105: Based on the contents of the HO OK, the relay station RN determines the base station eNB1 as the target of handover, and notifies the mobile station UE of the result by means of an HO Command (handover instruction).

S106: After sending a handover instruction to the mobile station UE by means of the HO Command, the relay station RN forwards the data which has been received from the gateway device GW and is not yet completely transmitted to the mobile station UE, to the base station eNB1, which is the target of handover. The data is subjected to receiving and transmitting processes at the higher-level base station eNB0 and then transmitted to the base station eNB1.

S107: On confirming based on the contents of the HO Command that the handover to the base station eNB1 is possible, the mobile station UE executes a handover to the base station eNB1 and transmits an HO Complete (handover completion signaling) to the base station eNB1.

S108: When the HO Complete is received, the base station eNB1 transmits a Path SW, which is data destination switching signaling, to the gateway device GW.

S109: On receiving the Path SW, the gateway device GW switches the destination of data from the higher-level base station eNB0 to the base station eNB1, and transmits the data to the base station eNB1. After the destination is switched, the data is transmitted via the base station eNB1 to the mobile station UE.

In the handover sequence described above, data is exchanged wirelessly between the relay station RN and the higher-level base station eNB0 in Step S106. Such exchange of data increases the volume of wireless communication via the radio propagation path between the relay station RN and the higher-level base station eNB0, with the result that the level of interference from or to other stations rises, giving rise to the problem that the communication quality deteriorates. Also, in the case of wireless communication, processes such as the establishment of a radio link cause a substantial delay, and therefore, a problem also arises in that the processing delay increases if wireless communication takes place frequently.

Although in the above explanation, handover is taken as an example, similar problems can also arise in relation to other communication control procedures.

SUMMARY

According to an aspect of the present invention, a wireless communication system includes: a first wireless base station; a second wireless base station; and a relay station connected wirelessly to the first wireless base station to perform relayed communication via the first wireless base station, wherein, when a mobile station at a lower level than the relay station executes a handover to the second wireless base station, the first wireless base station switches a data transfer route by redirecting data which is not yet completely transmitted to the mobile station, so as to be forwarded to the second wireless base station to which the mobile station is handed over.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates a handover sequence.

DESCRIPTION OF EMBODIMENTS

Embodiments of the present invention will be described below with reference to the accompanying drawings.

Figure 1:
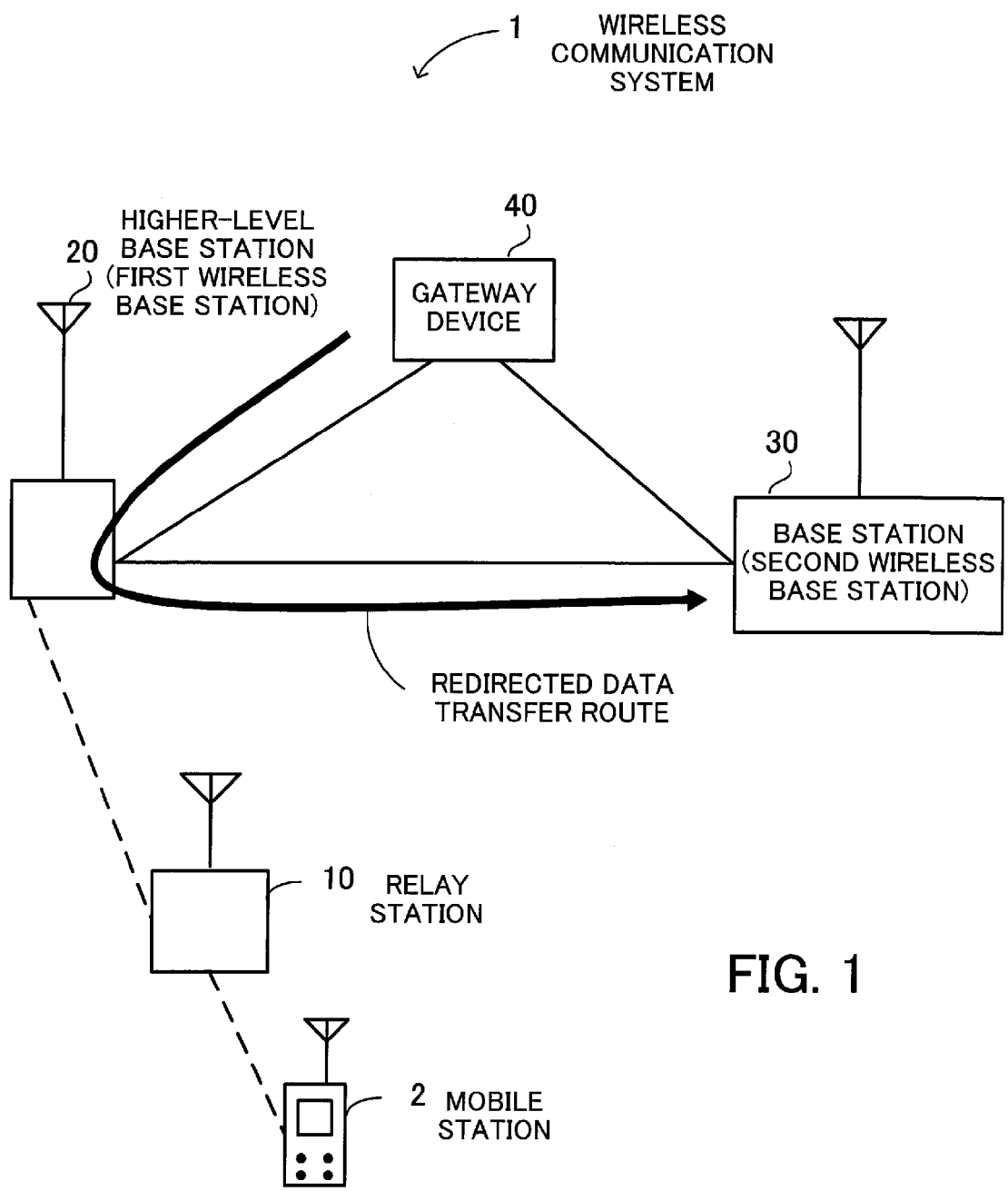
FIG. 1 illustrates an exemplary configuration of a wireless communication system.

FIG. 1 illustrates an exemplary configuration of a wireless communication system. The wireless communication system 1 includes a relay station 10, a higher-level base station (first wireless base station) 20, a base station (second wireless base station) 30, a gateway device 40, and a mobile station 2. The gateway device 40 exists in a core network and is connected to the higher-level base station 20 and the base station 30 by a cable. Also, the higher-level base station 20 and the base station 30 are interconnected by a cable. Further, the relay station 10 is connected wirelessly to the higher-level base station 20 to perform relayed communication via the higher-level base station 20.

When the mobile station 2, which is at a lower level than the relay station 10, executes a handover to the base station 30, the higher-level base station 20 switches the data transfer route by redirecting data which is not yet completely transmitted to the mobile station 2, so as to be forwarded to the base station 30 to which the mobile station 2 is handed over.

Figure 11:
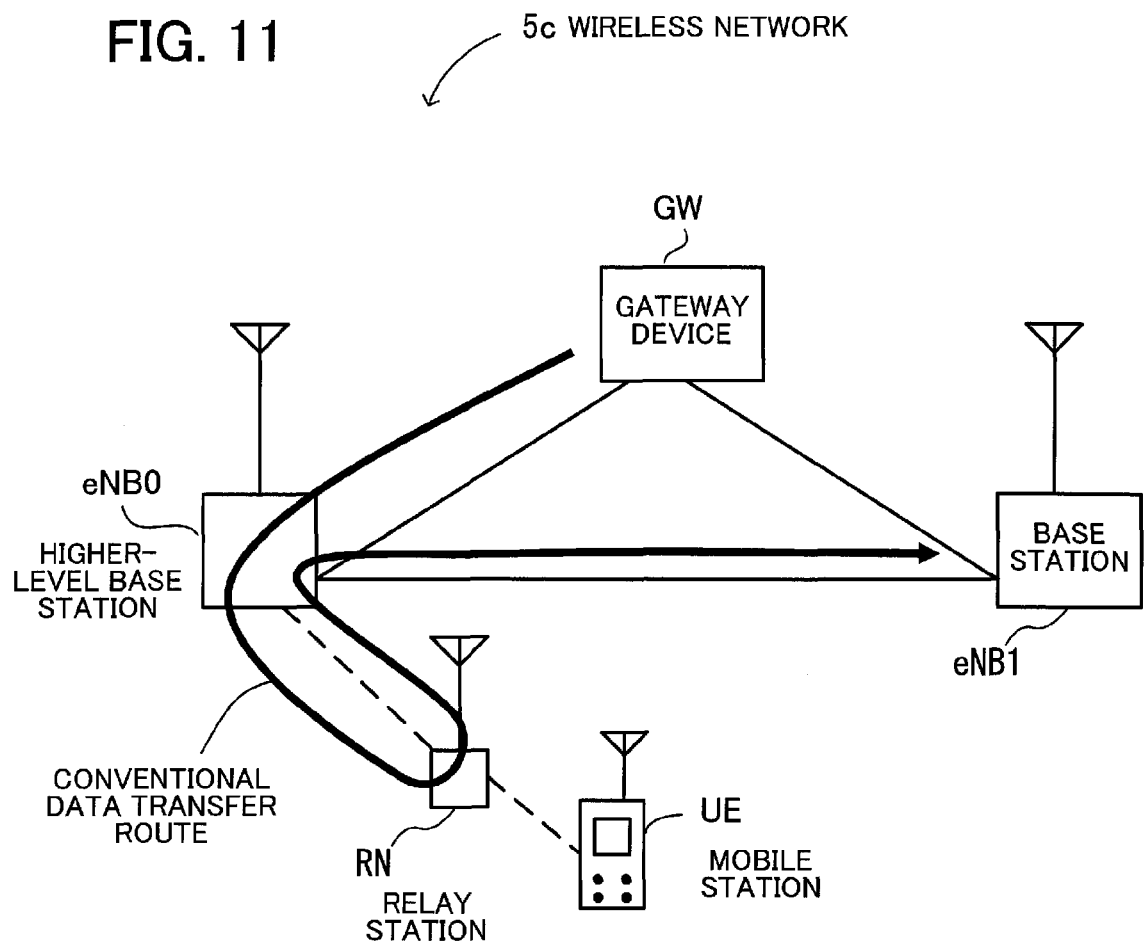
FIG. 11 illustrates the manner of how handover is executed on a wireless network.

The illustrated data transfer route will be compared with that illustrated in FIG. 11. In FIG. 11, when the mobile station UE executes a handover to the base station eNB1, the data which is not yet completely transmitted to the mobile station UE is redirected by the relay station RN and transmitted via the higher-level base station eNB0 to the base station eNB1.

In the wireless communication system 1, on the other hand, the data is redirected by the higher-level base station 20 to be transmitted to the base station 30. Thus, with the wireless communication system 1, the volume of wireless communication between the relay station 10 and the higher-level base station 20 can be reduced.

Figure 2:
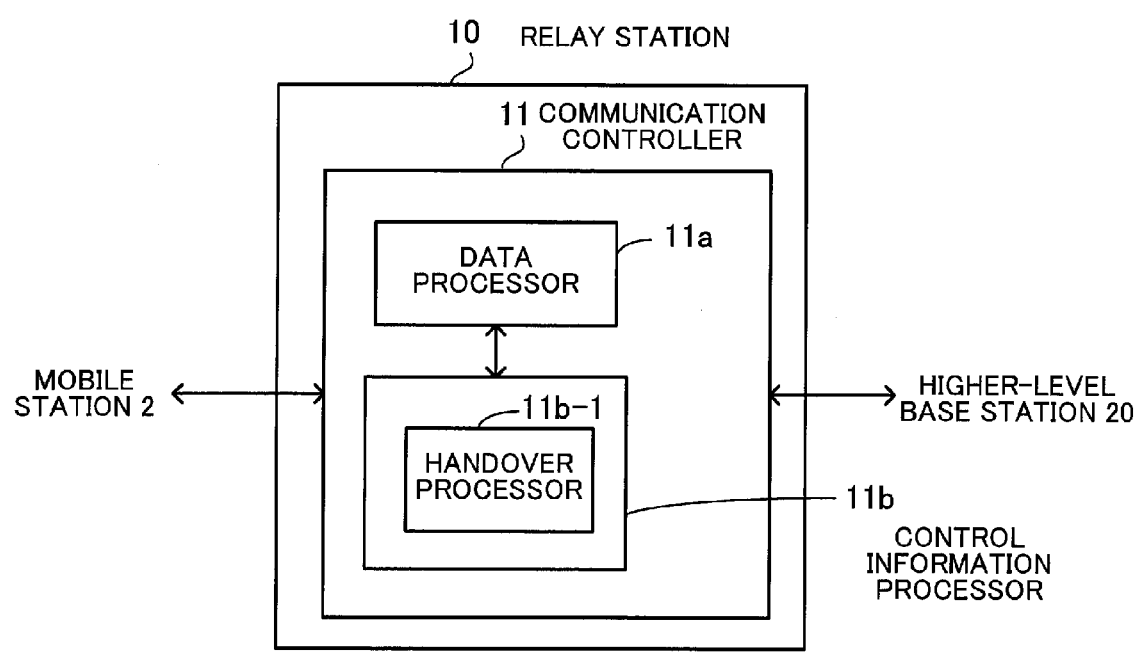
FIG. 2 illustrates an exemplary configuration of a relay station.

The configuration and operation of the relay station and the higher-level base station 20 in the wireless communication system 1 will be now described in detail. FIG. 2 illustrates an exemplary configuration of the relay station 10. The relay station 10 includes a communication controller 11. The communication controller 11 includes a data processor 11a and a control information processor 11b. The control information processor 11b includes a handover processor 11b-1.

The communication controller 11 controls the communication with the mobile station 2 or the higher-level base station 20. The data processor 11a performs processes for transmitting and receiving data, and the control information processor 11b performs processes for transmitting and receiving control information.

When the mobile station 2 at a lower level than the relay station executes a handover, the handover processor 11b-1 generates signaling for executing the handover. Also, the handover processor 11b-1 performs processes for transmitting and receiving signaling related to a virtual handover, described later.

Figure 3:
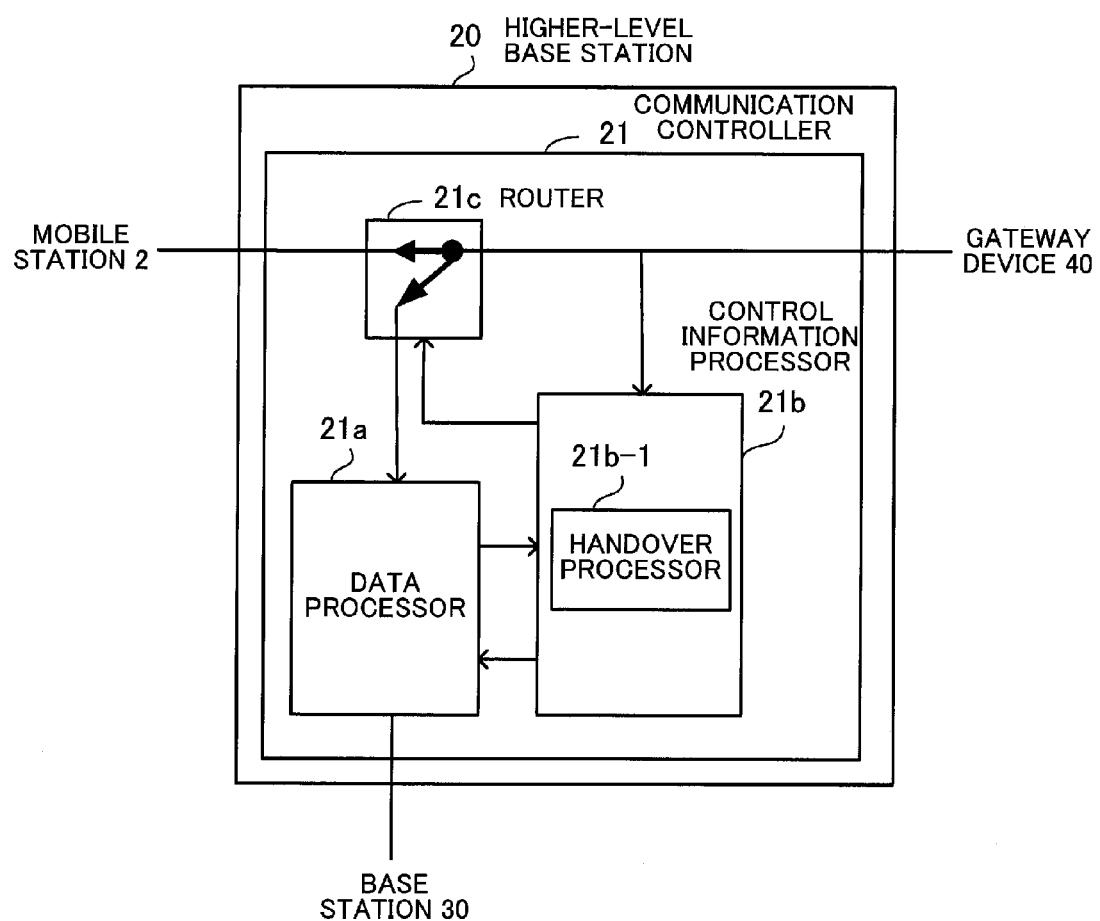
FIG. 3 illustrates an exemplary configuration of a higher-level base station.

FIG. 3 illustrates an exemplary configuration of the higher-level base station 20. The higher-level base station 20 includes a communication controller 21. The communication controller 21 includes a data processor 21a, a control information processor 21b, and a router 21c (corresponding to a route switching unit). The control information processor 21b includes a handover processor 21b-1.

The communication controller 21 controls the communication with the mobile station 2 and also controls the communication with other base stations or the gateway device 40. The data processor 21a performs processes for transmitting and receiving the data, and the control information processor 21b performs processes for transmitting and receiving the control information.

The control information processor 21b determines whether the data received from the gateway device 40 is addressed thereto or to the mobile station, and switches the route of the router 21c accordingly. If the data is addressed to the higher-level base station, the router is switched such that the data is output to the data processor 21a, and if the data is addressed to the mobile station, the router is switched such that the data is output to the relay station 10. In accordance with a switching instruction from the control information processor 21b, the router 21c switches the output direction of data.

Following instructions from the control information processor 21b, the data processor 21a forwards the data to a specified base station. The base station 30 alone is illustrated as the forwarding destination, but where there are a plurality of base stations that may be forwarding destinations, the data processor 21a is connected to the multiple base stations and forwards the data through a port connected to a suitable base station. The handover processor 21b-1 performs processes for transmitting and receiving the virtual handover-related signaling, described later.

Figure 4:
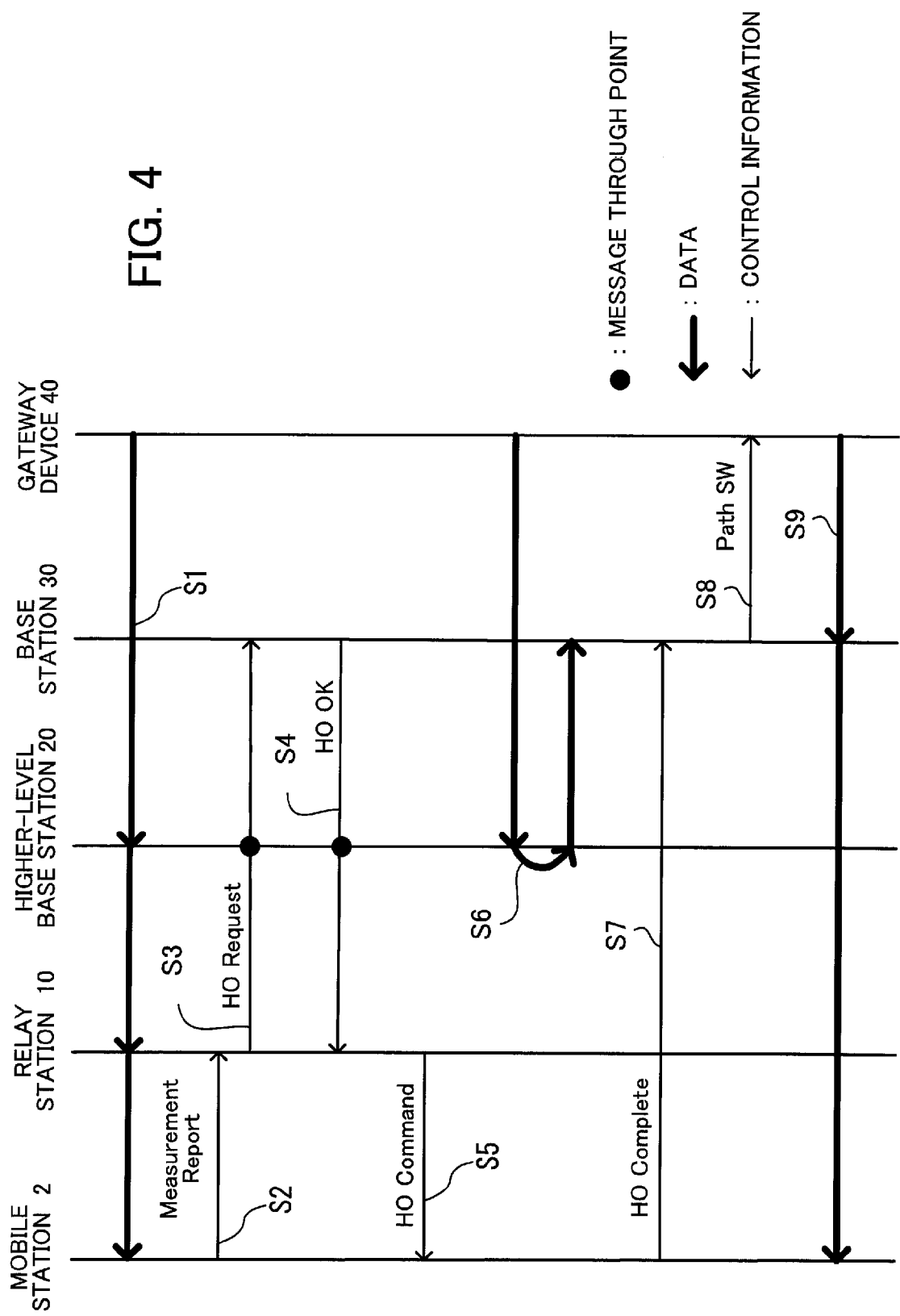
FIG. 4 illustrates a communication sequence.

FIG. 4 illustrates a communication sequence, wherein data which is not yet completely transmitted to the mobile station 2 from the relay station 10 as a source of handover is forwarded to the base station 30 as a target of handover by the higher-level base station 20. In the sequence diagrams explained below, thick arrows indicate flows of the data, and thin arrows indicate flows of the control information.

S1: The gateway device 40 transmits data to the mobile station 2. The data is first sent to the higher-level base station 20, where the receiving and transmitting processes are performed and the data is transmitted to the relay station 10. The relay station 10 performs the receiving and transmitting processes and transmits the data to the mobile station 2.

S2: When executing a handover, the mobile station 2 measures the reception levels of radio waves received from nearby base stations, and transmits information about the measured reception levels to the relay station 10 by including the reception level measurement information in a Measurement Report.

S3: On receiving the Measurement Report, the relay station 10 recognizes that the mobile station 2 is going to execute a handover, and identifies, based on the reception level measurement information, the base station 30 with respect to which a satisfactorily high reception level has been measured, as a candidate for the target of handover. The relay station 10 transmits an HO Request to the base station 30. The HO Request is transmitted via the higher-level base station 20 to the base station 30.

S4: When the HO Request is received, the base station 30 determines whether or not the handover is possible, and if the handover is possible, the base station 30 sends an HO OK as a response. The HO OK is transmitted via the higher-level base station 20 to the relay station 10.

S5: Based on the contents of the HO OK, the relay station 10 determines the base station 30 as the target of handover, and notifies the mobile station 2 of the result by means of an HO Command.

S6: The higher-level base station 20 forwards the data which has been received from the gateway device 40 and is not yet completely transmitted to the mobile station 2, to the base station 30, which is the target of handover.

S7: On confirming based on the contents of the HO Command that the handover to the base station 30 is possible, the mobile station 2 executes a handover to the base station 30 and then transmits an HO Complete to the base station 30.

S8: When the HO Complete is received, the base station 30 transmits a Path SW, which is data destination switching signaling, to the gateway device 40.

S9: On receiving the Path SW, the gateway device 40 switches the destination of data from the higher-level base station 20 to the base station 30 and transmits, to the base station 30, data addressed to the mobile station 2. The data is subjected to receiving and transmitting processes at the base station 30 and transmitted to the mobile station 2.

As explained above, on recognizing that the mobile station 2 is going to execute a handover to the base station 30, the relay station 10 sends a handover instruction to the base station 30. At this time, the higher-level base station 20 switches the data transfer route such that the data received from the gateway device 40 and addressed to the mobile station 2 is redirected so as to be forwarded to the base station 30, as stated above in Step S6. This makes it possible to reduce the volume of data communicated wirelessly between the relay station 10 and the higher-level base station 20.

The following describes the case where handover signaling communication related to virtual handover is executed between the relay station 10 and the higher-level base station 20 when the data transfer route is switched.

Figure 5:
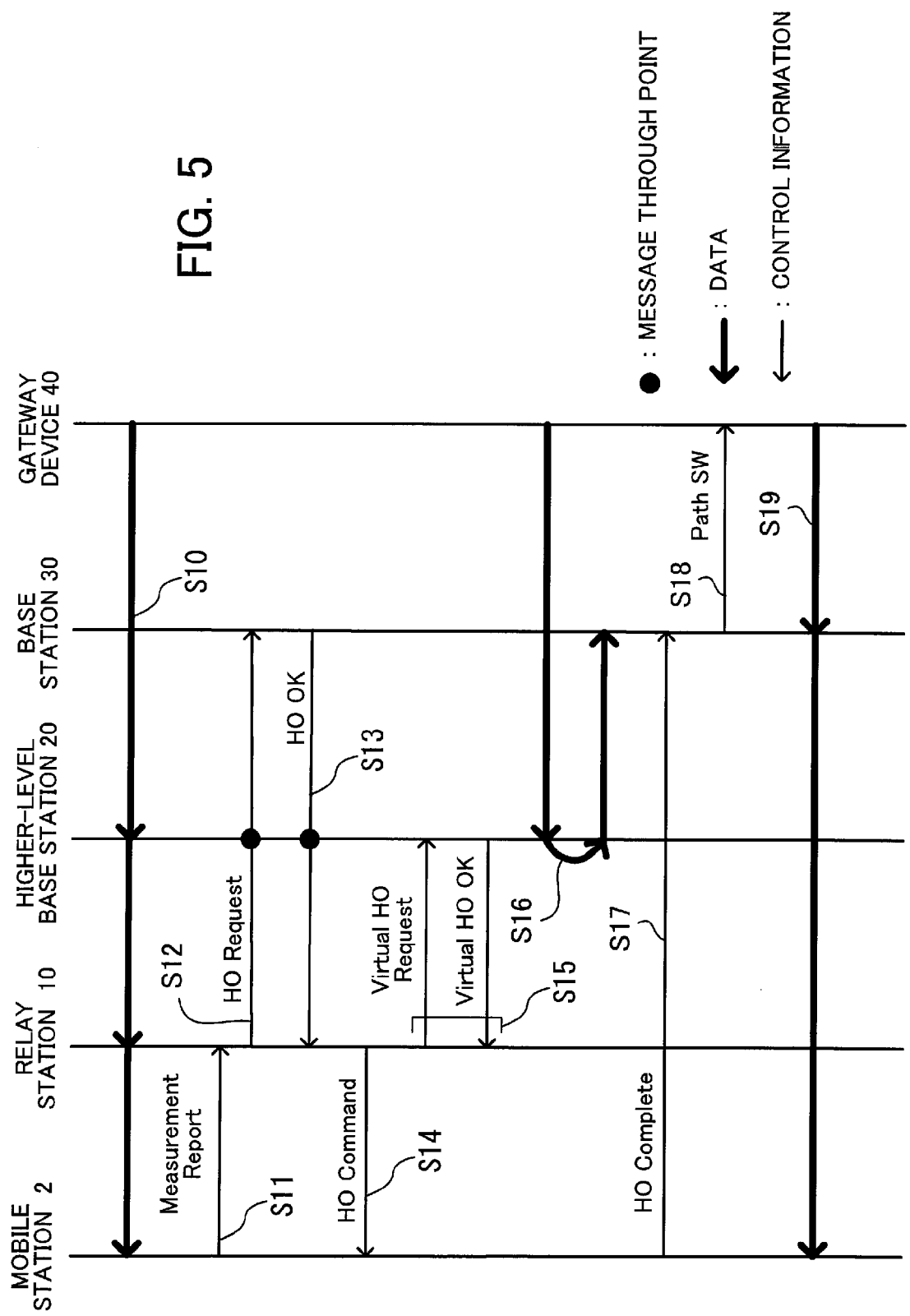
FIG. 5 illustrates a communication sequence.

FIG. 5 illustrates a communication sequence.

S10: The gateway device 40 transmits data to the mobile station 2. The data is transmitted first to the higher-level base station 20, where the receiving and transmitting processes are performed and the data is transmitted to the relay station 10. Subsequently, the relay station 10 performs the receiving and transmitting processes and transmits the data to the mobile station 2.

S11: When executing a handover, the mobile station 2 measures the reception levels of radio waves received from nearby base stations, and transmits information about the measured reception levels to the relay station 10 by including the reception level measurement information in the Measurement Report.

S12: On receiving the Measurement Report, the relay station 10 recognizes that the mobile station 2 is going to execute a handover, and identifies, based on the reception level measurement information, the base station 30 with respect to which a satisfactorily high reception level has been measured, as a candidate for the target of handover. The relay station 10 transmits an HO Request to the base station 30. The HO Request is transmitted via the higher-level base station 20 to the base station 30.

S13: When the HO Request is received, the base station 30 determines whether or not the handover is possible, and if the handover is possible, the base station 30 sends an HO OK as a response. The HO OK is transmitted via the higher-level base station 20 to the relay station 10.

S14: Based on the contents of the HO OK, the relay station 10 determines the base station 30 as the target of handover, and notifies the mobile station 2 of the result by means of an HO Command.

S15: After sending a handover instruction to the mobile station 2 by means of the HO command, the relay station 10 transmits a Virtual HO Request to the higher-level base station 20 to request a virtual handover to the higher-level base station so that the data transfer route may be switched. When the Virtual HO Request is received, the higher-level base station 20 sends a Virtual HO Response, as virtual handover response signaling, to the relay station 10 (in the figure, Virtual HO OK, which is permission signaling, is sent as the Virtual HO Response).

Thus, the Virtual HO Request and the Virtual HO Response are exchanged between the relay station 10 and the higher-level base station 20, to perform handover signaling communication for executing a handover from the relay station 10 to the higher-level base station 20.

On recognizing that the mobile station 2 is going to execute a handover, the relay station 10 sends a handover request to the base station 30 to which the mobile station 2 is to be handed over. In this case, the aforementioned handover signaling communication between the relay station 10 and the higher-level base station 20 is performed, and as a result, two handovers, one from the relay station 10 to the higher-level base station 20 and the other from the higher-level base station 20 to the base station 30, are executed, thereby accomplishing the handover from the relay station 10 to the base station 30.

Such handover executed in stages at the network side is herein called virtual handover. The virtual handover is executed only within the network, and the mobile station 2 is uninformed of the virtual handover.

At the network side, therefore, handover is executed twice from the relay station 10 to the higher-level base station 20 and from the higher-level base station 20 to the base station 30, but with respect to the mobile station 2, handover is executed only once from the relay station 10 to the base station 30.

S16: The higher-level base station 20 forwards the data which has been received from the gateway device 40 and is not yet completely transmitted to the mobile station 2, to the base station 30, which is the target of handover.

S17: On confirming based on the contents of the HO Command that the handover to the base station 30 is possible, the mobile station 2 executes a handover to the base station 30 and transmits an HO Complete to the base station 30.

S18: When the HO Complete is received, the base station 30 transmits a Path SW, which is data destination switching signaling, to the gateway device 40.

S19: On receiving the Path SW, the gateway device 40 switches the destination of data from the higher-level base station 20 to the base station 30 and transmits, to the base station 30, data addressed to the mobile station 2. The data is subjected to the receiving and transmitting processes at the base station 30 and transmitted to the mobile station 2.

In this manner, after instructing the mobile station 2 to execute a handover to the base station 30, the relay station 10 requests a virtual handover to the higher-level base station 20 in order that the data transfer route may be switched.

Then, when the virtual handover is executed between the relay station 10 and the higher-level base station 20, the higher-level base station 20 switches the data transfer route to forward data therefrom to the base station 30.

Such control procedure enables efficient switching of the data transfer route, so that the volume of data communicated wirelessly between the relay station 10 and the higher-level base station 20 can be reduced, making it possible to suppress the increase in interference or processing delay.

In the 3GPP specifications, a communication path from a network to a mobile station is usually switched by means of handover. Accordingly, the aforementioned control procedure in which the switching of the data transfer route is triggered by the virtual handover has a high affinity for 3GPP systems. Also, the network-side route alone is switched and the mobile station 2 may perform a handover normally, making it unnecessary to add a special procedure for the mobile station 2 or to modify the procedure.

In the aforementioned case, when a virtual handover is executed between the relay station 10 and the higher-level base station 20, the virtual handover is requested from the relay station 10. The following describes the case where the virtual handover is requested from the higher-level base station 20 in order to switch the data transfer route.

Figure 6:
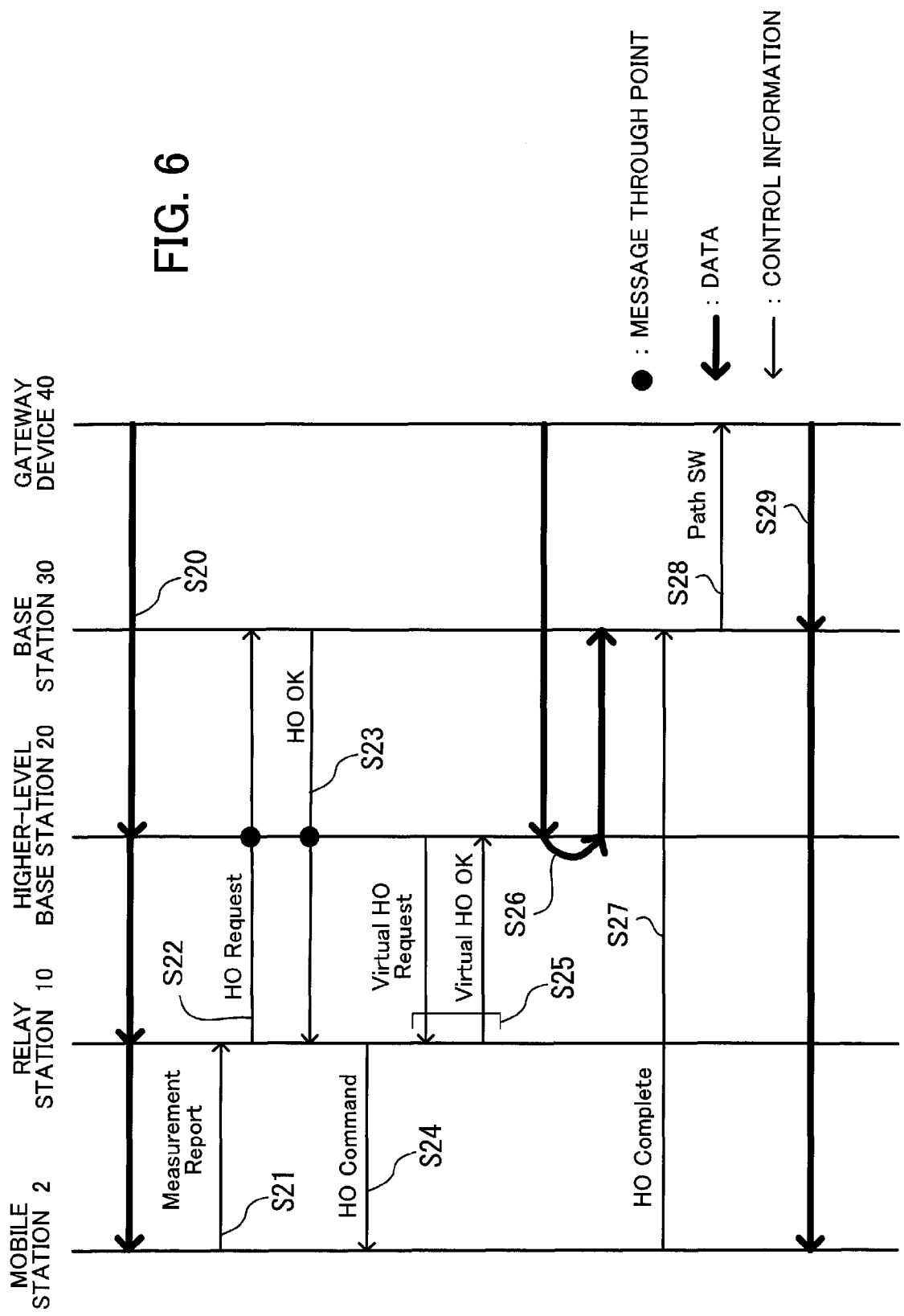
FIG. 6 illustrates a communication sequence.

FIG. 6 illustrates a communication sequence.

S20: The gateway device 40 transmits data to the mobile station 2. The data is first sent to the higher-level base station 20, where the receiving and transmitting processes are performed and the data is transmitted to the relay station 10. Subsequently, the relay station 10 performs the receiving and transmitting processes and transmits the data to the mobile station 2.

S21: When executing a handover, the mobile station 2 measures the reception levels of radio waves received from nearby base stations, and transmits information about the measured reception levels to the relay station 10 by including the reception level measurement information in the Measurement Report.

S22: On receiving the Measurement Report, the relay station 10 recognizes that the mobile station 2 is going to execute a handover, and identifies, based on the reception level measurement information, the base station 30 with respect to which a satisfactorily high reception level has been measured, as a candidate for the target of handover. The relay station 10 transmits an HO Request to the base station 30. The HO Request is transmitted via the higher-level base station 20 to the base station 30.

S23: When the HO Request is received, the base station 30 determines whether or not the handover is possible, and if the handover is possible, the base station 30 sends an HO OK as a response. The HO OK is transmitted via the higher-level base station 20 to the relay station 10.

S24: Based on the contents of the HO OK, the relay station 10 determines the base station 30 as the target of handover, and notifies the mobile station 2 of the result by means of an HO Command.

S25: In order to switch the data transfer route, the higher-level base station 20 transmits a Virtual HO Request to the relay station 10 to request the relay station 10 to execute a virtual handover. When the Virtual HO Request is received, the relay station 10 sends a Virtual HO OK, as virtual handover permission signaling, to the higher-level base station 20.

S26: The higher-level base station 20 forwards the data which has been received from the gateway device 40 and is not yet completely transmitted to the mobile station 2, to the base station 30, which is the target of handover.

S27: On confirming based on the contents of the HO Command that the handover to the base station 30 is possible, the mobile station 2 executes a handover to the base station 30 and transmits an HO Complete to the base station 30.

S28: When the HO Complete is received, the base station 30 transmits a Path SW, which is data destination switching signaling, to the gateway device 40.

S29: On receiving the Path SW, the gateway device 40 switches the destination of data from the higher-level base station 20 to the base station 30, and transmits, to the base station 30, data addressed to the mobile station 2. The data is subjected to the receiving and transmitting processes at the base station 30 and transmitted to the mobile station 2.

Thus, in the sequence described above, the virtual handover for switching the route is requested from the higher-level base station 20. Specifically, on detecting the execution of a handover at the relay station 10, the higher-level base station 20 requests the relay station 10 to execute a virtual handover for switching the route.

To detect the execution of a handover at the relay station 10, the higher-level base station 20 may detect, for example, the handover request signaling from the relay station 10 to the base station 30, executed in Step S22, or the handover permission signaling from the base station 30 to the relay station 10, executed in Step S23 (the signaling between the relay station 10 and the base station 30 is executed via the higher-level base station 20 and thus can be detected by the higher-level base station 20).

The following describes the case where the execution of a handover at the relay station 10 is detected by means of handover-related signaling communicated between the relay station and the base station 30, and the data transfer route is switched when such signaling is detected.

Figure 7:
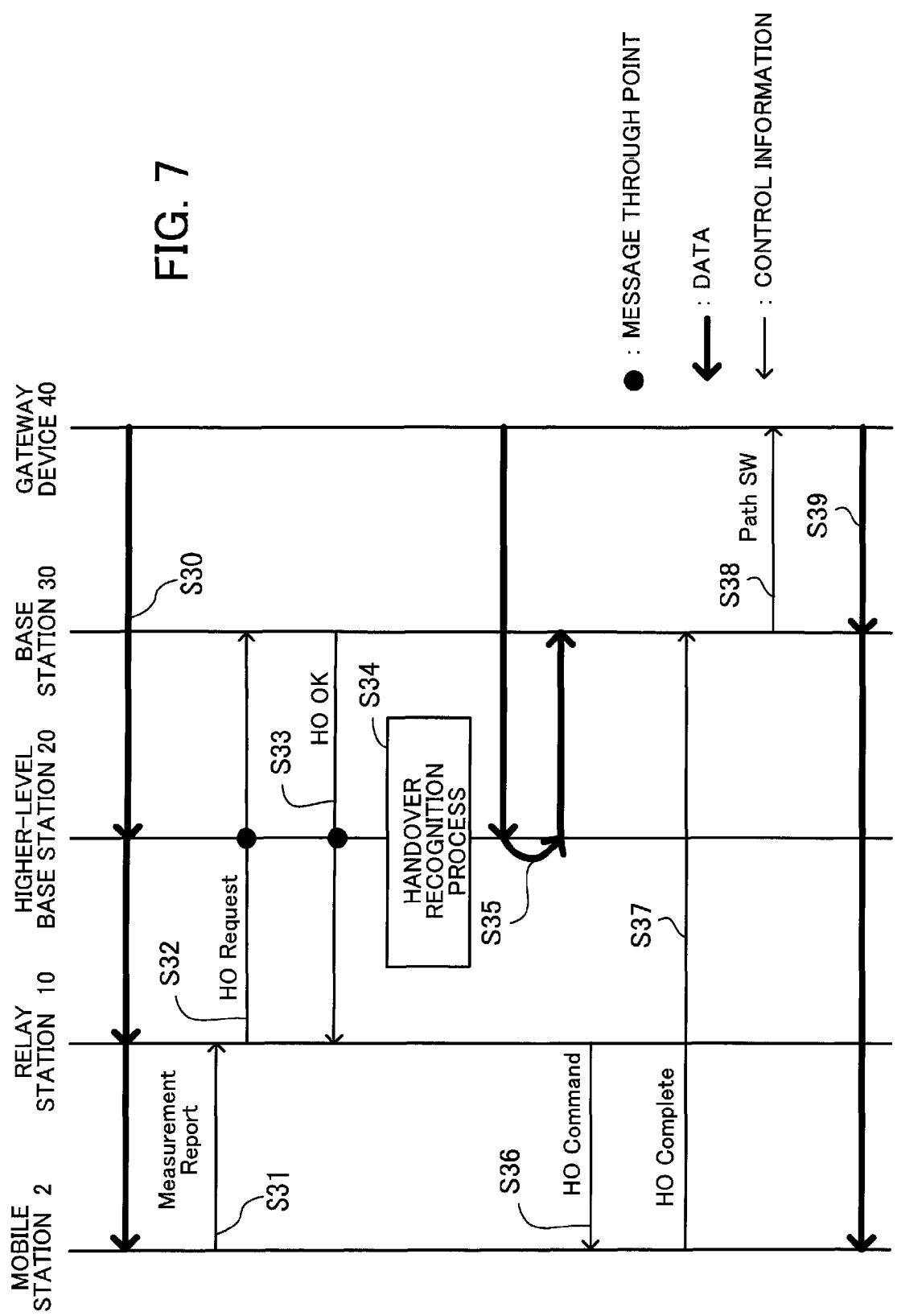
FIG. 7 illustrates a communication sequence.

FIG. 7 illustrates a communication sequence, wherein the handover request signaling transmitted from the relay station 10 is detected as the handover-related signaling and the route is switched when the signaling is detected.

S30: The gateway device 40 transmits data to the mobile station 2. The data is first sent to the higher-level base station 20, where the receiving and transmitting processes are performed and the data is transmitted to the relay station 10. Subsequently, the relay station 10 performs the receiving and transmitting processes and transmits the data to the mobile station 2.

S31: When executing a handover, the mobile station 2 measures the reception levels of radio waves received from nearby base stations, and transmits information about the measured reception levels to the relay station 10 by including the reception level measurement information in the Measurement Report.

S32: On receiving the Measurement Report, the relay station 10 recognizes that the mobile station 2 is going to execute a handover, and identifies, based on the reception level measurement information, the base station 30 with respect to which a satisfactorily high reception level has been measured, as a candidate for the target of handover. The relay station 10 transmits an HO Request to the base station 30. The HO Request is transmitted via the higher-level base station 20 to the base station 30.

S33: When the HO Request is received, the base station 30 determines whether or not the handover is possible, and if the handover is possible, the base station 30 sends an HO OK as a response. The HO OK is transmitted via the higher-level base station 20 to the relay station 10.

S34: The higher-level base station 20 detects the handover request signaling transmitted from the relay station 10 in Step S32, and recognizes the execution of a handover at the relay station 10.

S35: The higher-level base station 20 forwards the data which has been received from the gateway device 40 and is not yet completely transmitted to the mobile station 2, to the base station 30, which is the target of handover.

S36: Based on the contents of the HO OK, the relay station 10 determines the base station 30 as the target of handover, and notifies the mobile station 2 of the result by means of an HO Command.

S37: On confirming based on the contents of the HO Command that the handover to the base station 30 is possible, the mobile station 2 executes a handover to the base station 30 and then transmits an HO Complete to the base station 30.

S38: When the HO Complete is received, the base station 30 transmits a Path SW, which is data destination switching signaling, to the gateway device 40.

S39: On receiving the Path SW, the gateway device 40 switches the destination of data from the higher-level base station 20 to the base station 30, and transmits, to the base station 30, data addressed to the mobile station 2. The data is subjected to the receiving and transmitting processes at the base station 30 and transmitted to the mobile station 2.

In this manner, the higher-level base station 20 is configured to control the switching of the data transfer route by detecting the handover request signaling transmitted from the relay station 10 (the handover request signaling is transmitted via the higher-level base station 20 and therefore, can be detected by the higher-level base station 20).

Such control procedure permits efficient switching of the data transfer route, so that the volume of data communicated wirelessly between the relay station 10 and the higher-level base station 20 can be reduced, making it possible to suppress the increase in interference or processing delay.

By detecting the handover request signaling in order to control the switching of the data transfer route, it is possible to further reduce the amount of signaling between the relay station 10 and the higher-level base station 20, compared with the case where the virtual handover is executed to switch the route. Also, since no explicit signaling is involved, unlike the case where the virtual handover is executed, the processing delay can be effectively reduced.

In the above explanation, the handover request signaling transmitted from the relay station 10 to the base station 30 is detected to control the switching of the data transfer route. Alternatively, the switching of the data transfer route may be controlled by detecting the handover permission signaling transmitted from the base station 30 to the relay station 10.

The following describes the case where the data transfer route once switched is changed back to the original route because of failure of the handover of the mobile station 2.

Figure 8:
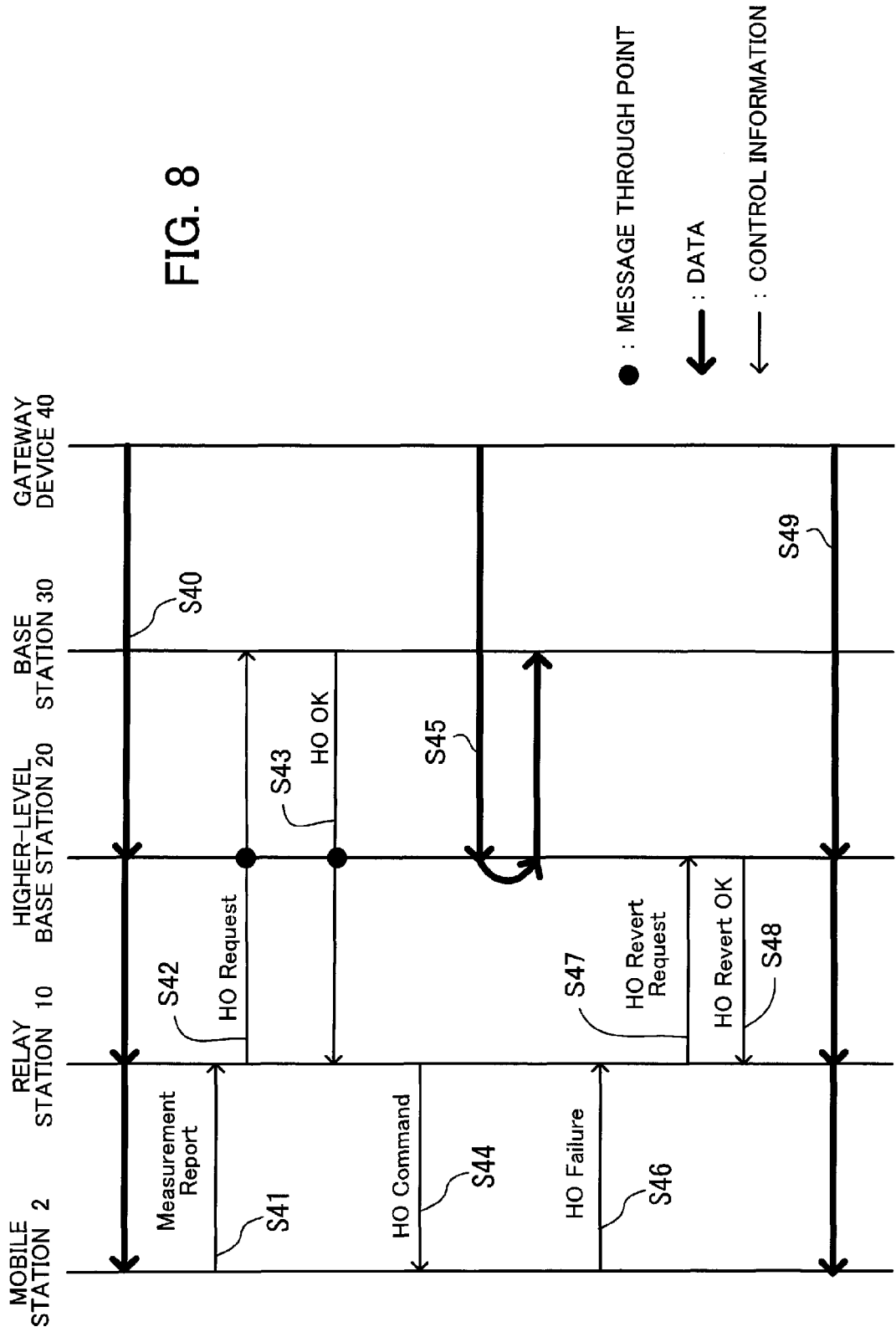
FIG. 8 illustrates a communication sequence.
Figure 9:
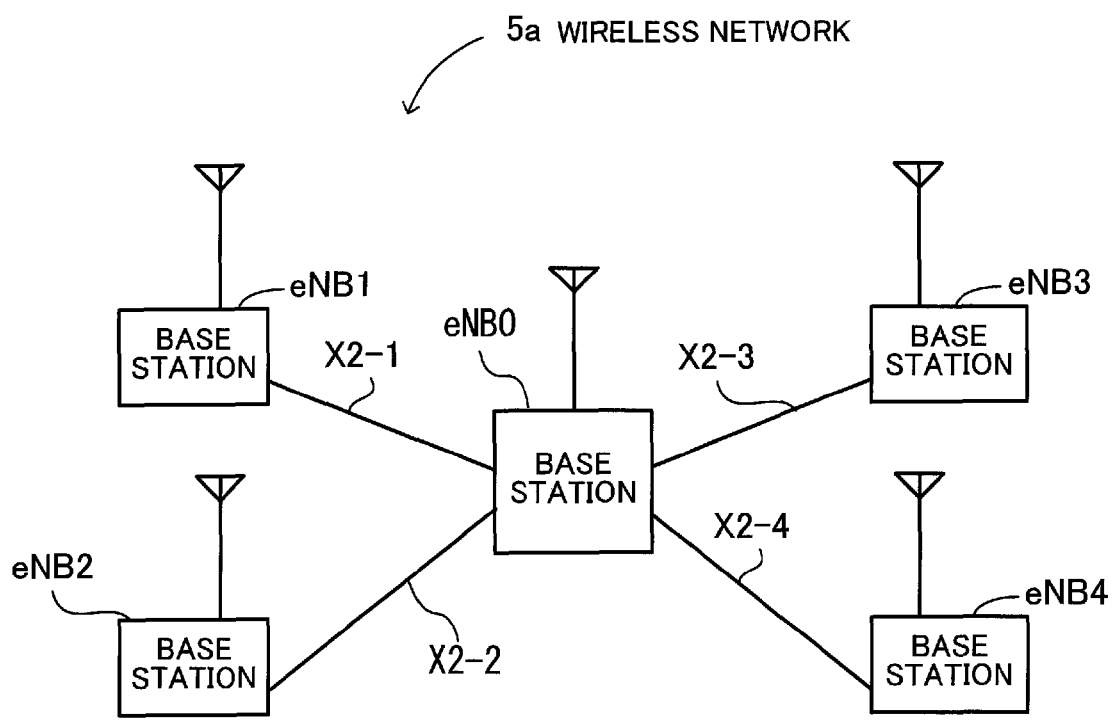
FIG. 9 illustrates an inter-base station interface.
Figure 10:
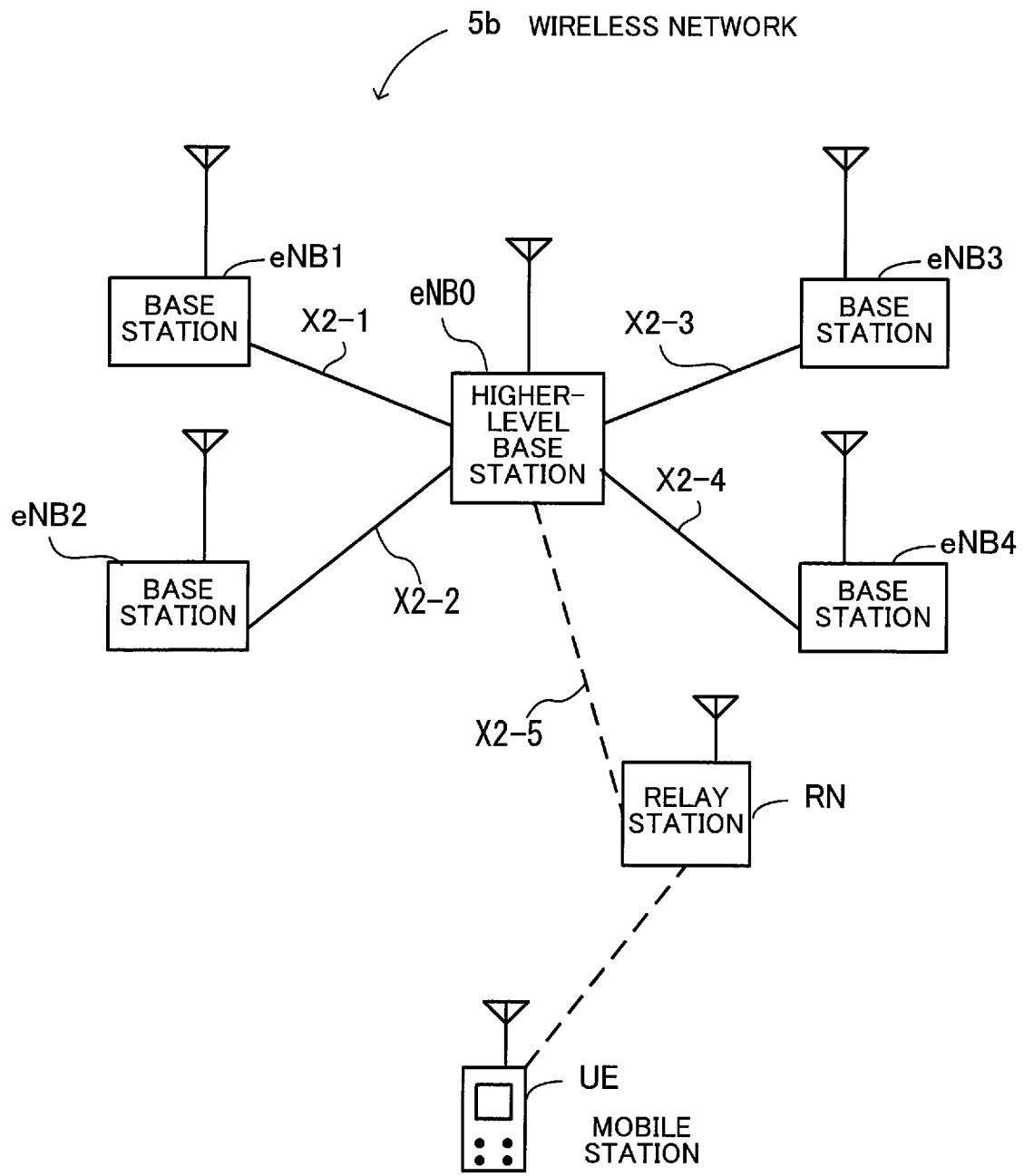
FIG. 10 illustrates an inter-base station interface involving a relay station.

FIG. 8 illustrates a communication sequence.

S40: The gateway device 40 transmits data to the mobile station 2. The data is first sent to the higher-level base station 20, which performs the receiving and transmitting processes and then transmits the data to the relay station 10. The relay station 10 performs the receiving and transmitting processes and transmits the data to the mobile station 2.

S41: When executing a handover, the mobile station 2 measures the reception levels of radio waves received from nearby base stations, and transmits information about the measured reception levels to the relay station 10 by including the reception level measurement information in the Measurement Report.

S42: On receiving the Measurement Report, the relay station 10 recognizes that the mobile station 2 is going to execute a handover, and identifies, based on the reception level measurement information, the base station 30 with respect to which a satisfactorily high reception level has been measured, as a candidate for the target of handover. The relay station 10 transmits an HO Request to the base station 30. The HO Request is transmitted via the higher-level base station 20 to the base station 30.

S43: When the HO Request is received, the base station 30 determines whether or not the handover is possible, and if the handover is possible, the base station 30 sends an HO OK as a response. The HO OK is transmitted via the higher-level base station 20 to the relay station 10.

S44: Based on the contents of the HO OK, the relay station 10 determines the base station 30 as the target of handover, and notifies the mobile station 2 of the result by means of an HO Command.

S45: The higher-level base station 20 forwards the data which has been received from the gateway device 40 and is not yet completely transmitted to the mobile station 2, to the base station 30, which is the target of handover.

S46: Since the handover has failed, the mobile station 2 transmits an HO Failure to the relay station 10.

S47: On recognizing that when the HO Failure is received, the data transfer route has already been switched, the relay station 10 requests the higher-level base station 20 to change the data transfer route back. In this case, an HO Revert Request is transmitted as restoration request signaling.

S48: The higher-level base station 20 changes the data transfer route back to the one used before the handover and then transmits an HO Revert OK as restoration response signaling to the relay station 10.

S49: The higher-level base station 20 again transmits the data received from the gateway device 40 and addressed to the mobile station 2, to the relay station 10. The data is subjected to the receiving and transmitting processes at the relay station 10 and then transmitted to the mobile station 2.

When the handover of the mobile station 2 fails, the target of communication is usually changed to the original base station, but if the data transfer route has already been switched, then it is not possible to transmit data to the mobile station 2. Thus, if the handover of the mobile station 2 fails after the data transfer route is switched as stated above, the data transfer route once switched is changed back to the original route used before the handover, thereby enabling continued communication.

The control procedure described above makes it possible to continue the communication without causing any hindrance to the mobile station 2 even in the case where the handover of the mobile station 2 fails even though the data transfer route has already been switched.

As described above, the wireless communication system 1 is configured such that when the mobile station 2 at a lower level than the relay station 10 executes a handover to the base station 30, the higher-level base station 20 switches the data transfer route by redirecting data which is not yet completely transmitted to the mobile station 2, so as to be forwarded to the base station 30 to which the mobile station 2 is handed over.

Thus, when the mobile station 2 at a lower level than the relay station 10 executes a handover, the data can be forwarded without using a radio link, whereby the volume of wireless communication between the relay station 10 and the higher-level base station 20 can be curtailed. Since the interference from or to the other stations as well as the processing delay can be reduced, it is possible to improve the communication quality.

The volume of wireless communication between the relay station and the base station can be reduced to improve the communication quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless communication system comprising:
    a first wireless base station;
    a second wireless base station connected to the first wireless base station via a wired transmission path; and
    a relay station connected wirelessly to the first wireless base station to perform relayed communication via the first wireless base station,
    wherein, when a mobile station at a lower level than the relay station executes a handover to the second wireless base station, the first wireless base station switches a data transfer route by redirecting data which is not yet completely transmitted to the mobile station and transmits the data to the second wireless base station by wired communication, so as to be forwarded to the second wireless base station to which the mobile station is handed over;
    wherein:
    after the relay station instructs the mobile station to execute the handover to the second wireless base station,
    the relay station and the first wireless base station perform handover signaling communication with each other, the handover signaling communication being signaling communication for executing a handover from the relay station to the first wireless base station, and the first wireless base station switches the data transfer route after completion of the handover signaling communication; and wherein the handover signaling communication between the relay station and the first wireless base station is performed, and as a result, two handovers, one from the relay station to the first wireless base station and the other from the first wireless base station to the second wireless base station, are executed, thereby accomplishing the handover from the relay station to the second wireless base station, and wherein the first wireless base station switches the data transfer route upon detecting handover-related signaling which is communicated between the relay station and the second wireless base station when the handover is executed at the relay station.

2. The wireless communication system according to claim 1, wherein:

if a handover of the mobile station fails after the data transfer route is switched from the first wireless base station to the second wireless base station, the relay station transmits restoration request signaling to the first wireless base station to request restoration of the data transfer route, and the first wireless base station changes the data transfer route back to an original data transfer route used before the handover upon receiving the restoration request signaling.

3. The wireless communication system according to claim 1, wherein:

the relay station comprising:

a control information processor configured to process control information;

and a handover processor configured to perform a handover process when the mobile station at the lower level than the relay station executes the handover, wherein, after instructing the mobile station to execute the handover to the second wireless base station to which the mobile station is handed over, the handover processor performs handover signaling communication with the first wireless base station, the handover signaling communication being signaling communication for executing the handover from the relay station to the second wireless base station.

4. The wireless communication system according to claim 3, wherein:

if a handover of the mobile station to the second wireless base station fails after the first wireless base station switches the data transfer route by redirecting data which is not yet completely transmitted to the mobile station, so as to be forwarded to the second wireless base station, the control information processor transmits restoration request signaling to the first wireless base station to request restoration of the data transfer route.

5. A wireless base station connected wirelessly with a relay station to enable the relay station to communicate with a nearby wireless base station via a wire transmission path therethrough, comprising:

a control information processor configured to process control information;

and a route switching unit configured to switch a data transfer route for data addressed to a mobile station at a lower level than the relay station, wherein, when the mobile station executes a handover to a target base station to which the mobile station is handed over, the route switching unit switches the data transfer route by redirecting data which is not yet completely transmitted to the mobile station and transmits the data to a second wireless base station by wired communication, so as to be forwarded to the target base station;

wherein:

after the relay station instructs the mobile station to execute the handover, the control information processor performs handover signaling communication with the relay station, the handover signaling communication being signaling communication for executing a handover from the relay station to the wireless base station, and the route switching unit switches the data transfer route after completion of the handover signaling communication, wherein the handover signaling communication between the relay station and the wireless base station is performed, and as a result, two handovers, one from the relay station to the wireless base station and the other from the wireless base station to the target base station, are executed, thereby accomplishing the handover from the relay station to the target base station, and wherein:

the control information processor detects handover-related signaling which is communicated between the relay station and the target base station when the handover is executed at the relay station, and the route switching unit switches the data transfer route when the handover-related signaling is detected.

6. The wireless base station according to claim 5, wherein:

when a handover of the mobile station fails after the data transfer route is switched from the wireless base station to the target base station, the control information processor receives restoration request signaling which is transmitted from the relay station and which requests restoration of the data transfer route, and the route switching unit changes the data transfer route to an original data transfer route used before the handover.

7. A wireless communication method comprising:

using a first wireless base station, a second wireless base station connected to the first wireless base station via a wired transmission path, and a relay station connected wirelessly to the first wireless base station to perform relayed communication via the first wireless base station, wherein, when a mobile station at a lower level than the relay station executes a handover to the second wireless base station, the first wireless base station switches a data transfer route by redirecting data which is not yet completely transmitted to the mobile station and transmits the data to the second wireless base station by wired communication, so as to be forwarded to the second wireless base station to which the mobile station is handed over;

wherein:

after the relay station instructs the mobile station to execute the handover to the second wireless base station, the relay station and the first wireless base station perform handover signaling communication with each other, the handover signaling communication being signaling communication for executing a handover from the relay station to the first wireless base station, and the first wireless base station switches the data transfer route after completion of the handover signaling communication; and, wherein the handover signaling communication between the relay station and the first wireless base station is performed, and as a result, two handovers, one from the relay station to the first wireless base station and the other from the first wireless base station to the second base station, are executed, thereby accomplishing the handover from the relay station to the second base station, and wherein the first wireless base station switching the data transfer route upon detecting handover-related signaling which is communicated between the relay station and the second wireless base station when the handover is executed at the relay station.

\* \* \* \* \*